March 16, 1926. 1,576,735
R. A. FESSENDEN
INFUSOR
Filed Oct. 8, 1921
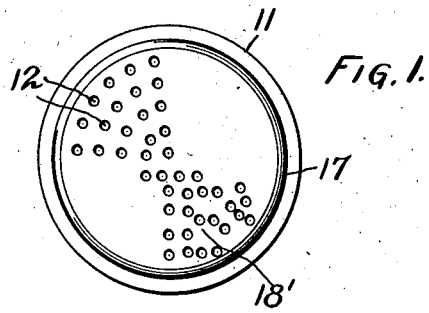
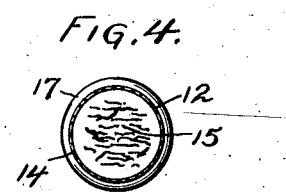
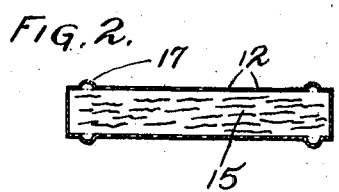
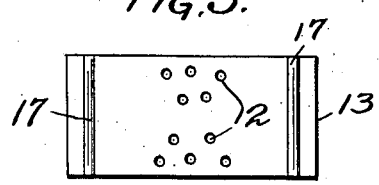
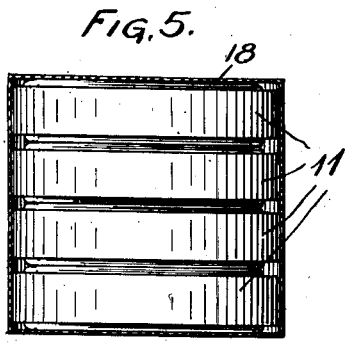
Reginald A. Fessenden.
Inventor Patented Mar. 16, 1926.

1,576,735

UNITED STATES PATENT OFFICE.

REGINALD A. FESSENDEN, OF CHESTNUT HILL, MASSACHUSETTS.

INFUSOR.

Application filed October 8, 1921. Serial No. 506,389.

*To all whom it may concern:*

Be it known that I, REGINALD A. FESSENDEN, a citizen of the United States, residing at Chestnut Hill, in the county of Middlesex and State of Massachusetts, have invented certain new and useful Improvements in Infusors, of which the following is the specification.

My invention relates to the making of infusions, such as tea, and has for its objects greater efficiency, convenience, reliability, uniformity, purity, economy, cleanliness and avoidance of deterioration of the infusive material and prevention of fraud.

Figures 1 and 3 show plan views and Figures 2 and 4 sectional views of containers for infusive materials, of the type described and claimed. Fig. 5 shows a multiple container in section.

Heretofore in the practice of the art it has been customary to make tea and similar infusions by placing the tea in a pot and pouring hot water over it, letting it steep and then serving it. This gave tea of various degrees of strength, containing more theine in the first portions and more tannin in the latter; and too hot at first and too cold at the last. Also it necessitated washing of the tea pot and cups to remove grounds. Also each one served received an infusion determined not by his wishes as to strength, but by the order in which he was served.

An alternative method was to place the tea in a bag, and suspend same in the tea pot. This had all the disadvantages of the first method, except the removal of grounds; and also was more or less unsanitary, as cloth collects dirt; and led to fraud, as applicant found on several occasions that some restaurants served the same bag to more than one guest.

A third method was the use of the individual tea ball, an approximately spherical metallic container which could be suspended in the cup. This was troublesome to use, as it had to be filled each time, and afterwards the tea grounds had to be removed and the tea ball well washed. Also the filling had to be done just before using, or the tea would deteriorate from exposure to the air. Also it was uneconomical, as so far as applicant knows, it always contained more tea than for one cup, being intended to be used more than once; also applicant has determined by examination that owing to the thickness of the body of tea leaves the extraction was not uniform, i. e., the outer layers were fully extracted of theine and the tannin had begun to come off before the theine was extracted from the centre of the ball. Also it provided no means, other than wasteful, of providing each individual with tea of the strength desired. Also, since the tea ball could be opened and filled by any one there was no guarantee, if served at a restaurant, that the tea would be of the grade specified.

Applicant overcomes the above difficulties and obtains other advantages by his invention of the type of container shown in the figures. These containers are preferably made of thin aluminum foil, perforated, though other materials may be used, e. g. thin veneers of orange wood. They are all characterized by the fact that their thickness is small compared to one of their other dimensions and by the fact that they are sealed; differing in these respects from all previous containers for infusionable materials.

The type shown in plan in Fig. 1 and in section in Fig. 2 is shaped like a piece of silver money, from which shape and their appearance they are termed "tea money." They are of different sizes, some being as large as a dollar, others the size of a fifty cent piece. Here in Figures 1 and 3, 11 is the container, perforated with numerous small holes, shown at 12; 17 is a corrugation in the flat side; and 15 is the filling of the infusionable material, e. g. tea.

Fig. 3 shows an oblong type 13, like a domino, but thinner; and Fig. 4 shows, on a larger scale, for the sake of clearness, a cylindrical type 14, like a cigarette. The sections of both these types are shown in Fig. 2, the sections in the planes containing the longest and shortest dimensions of the three types shown in Figs. 1, 3 and 4 being all similar.

By reason of the fact that these containers all have one dimension of a different and smaller order of magnitude than one of the other dimensions, and are perforated in a surface perpendicular to that dimension, the distance the infusing liquid has to travel in producing the infusion is small, and the infusive material is evenly and completely dissolved. Also, by reason of their being sealed, they can not be refilled with a cheaper grade of tea, without the use of expensive machinery, and hence are especially adapted for firms selling high grade teas wholesale. Also, for the reason that they are sealed, the grounds do not escape, and the tea pot and cups do not need to have the grounds removed.

Also, the corrugation prevents the serving of used tea, for on being used the first time the tea expands and the corrugation opens up, so that the container indicates by its appearance if it has been used and dried out.

The perforations may be sealed by dipping the containers in melted sugar, or gelatine, or chocolate, or condensed milk, (and later drying), or other suitable material. Since the containers have no projecting wires or hooks, and have two opposite substantially flat surfaces, they may be built up into a column, like a rouleau of money, and wrapped with aluminium or lead foil, as shown in Fig. 5. In this way the tea is permanently preserved from the air, and is formed into convenient packages for selling. In Fig. 5, 11, 11 are individual containers, and 18 is the wrapping foil.

The aluminium foil is unacted on by the tea or by the lemon juice or sugar which may be used in the tea.

The method of using these containers is as follows: A thermos pitcher, with a lid which may be tilted back by the thumb or finger, (not shown or claimed here because shown and claimed in another application) is brought to the table, containing hot water. The "tea money" is contained in a bowl, in the same manner as the lumps of sugar; (though the sugar itself, and milk powder may be placed in other similar containers if desired). The tea is served by filling a cup with the hot water, and placing a piece of the "tea money" in the saucer, beside the cup. The guest puts the "tea money" in his tea, and leaves it for a few moments, stirring if desired, till the tea has the right strength, and then lifts it out again and places it on his saucer. When he passes his cup back for a fresh cup, the hostess places the used container in a bowl provided for the purpose, and sends back a fresh cup of hot water and another container.

Applicant has discovered that tea is the only beverage which is palatable with alkaline water. As alkaline salts are very valuable medicinally, in acidosis, rheumatism, etc.; such alkaline salts, e. g. carbonate of soda, phosphate of soda, Glauber's salts, etc., may be mixed with the tea leaves in the container, and infused with the tea. In this case, if desired, the container may be made of copper foil; though if kept dry, until the time of infusion aluminium foil is entirely satisfactory.

As shown at 18', Fig. 1, the perforations may be arranged in the form of letters.

By the statement that one dimension of the infusor is made small compared with its large dimension is meant that it is made of substantially a different order of magnitude to that of the large dimension. For example, in Figures 1 and 2 the ratio shown is 1 to 8. That this is not a mere change of size involving a corresponding change of an old and well known effect, but on the contrary a change resulting in an entirely new technical effect will be seen by considering the mathematical theory of diffusion as given in Thomson and Poynting's Physics and in the Encyclopedia Brittanica, section Diffusion. From the laws there given it will be seen that if two tea-spoon-fulls of tea be placed in two infusors, both having the same number of perforations in top and bottom, but one twice as thick as the other, the material in the thin diffusor will be extracted in one eighth the time necessary for the thick infusor. This is in itself a great advantage, as economizing the tea, but also an entirely new and important technical effect is produced, for the outside layers of tea in the thick infusor being exposed to the liquid eight times longer than is necessary, for the extraction of the theine and flavouring matters, give up their tannin and other bitter principles, thus spoiling the flavour and taste. The thin infusor avoids this injurious superextraction and eliminates the acrid taste of the tannin. It is perhaps not too much to say that no one can obtain the true exquisite flavour of tea unless by the use of the container herein described, or by extracting it as is done by the tea tasters, i. e. spreading a thin layer loosely on the bottom of the cup; which latter method is objectionable for general use, and inconvenient.

By the statement that the infusors are made of substantially impervious material, with perforations, is meant that the diffusion does not take place through the substance of the material, as with filter paper and cloth. Where the diffusion takes place through the body of the material the crystalloid theine come through easily, as also the crystalloid tannin; but some of the advantageous materials and flavouring extractives are of large molecular weight and come through quite slowly. The perforations should be so large as possible without letting the tea sift out. This gives the maximum rate of diffusion, as may be seen from the papers on "stomata" by Jeffreys and Larmor in the Philosophical Magazine for April and May, 1918; where it is shown that such perforations "allow substantially free interchange between the inside and outside", which is not the case where the diffusion takes place through the body of the material.

By conjointly sealable, by stacking and wrapping is meant that the infusors are substantially flat on top and bottom to that extent that they may be stacked readily upon one another; and that they are substantially free from projections on the sides, to the extent that they may be readily wrapped, when assembled in a stack, by metallic foil and the like; and that they are rigid to the extent that they have definite linear dimensions, as distinguished from bags and the like made of flexible materials; and that the perforations are so small that the material will not sift out appreciably and therefore special elements, as individual covers, or top covers are not necessary to prevent the sifting out of the material into the space between the sides and top and bottom of the infusor stack and the wrapping foil.

By elastically deformable is meant formed from elastic as distinguished from flexible material, and automatically returning to shape if not bent beyond a certain angle, but not automatically returnable if bent beyond that angle.

By completely closed sides is meant that the sides of the infusors are without perforations, and are either integral, or if they have joints, are sealed over the whole joint, as distinguished from infusors with sewed sides or fastened by intermittent lugs. The complete closure prevents drainage from the infusor into the saucer when, after infusion, the infusor is placed, partly on edge, in the saucer.

By elastically sealed is meant sealed by elastically deforming the material at the edges of the joint.

By having its large dimension smaller that the largest dimension of the inside of the cup is meant an infusor having its largest dimension such that when dropped in the cup its large dimension will not project above the edge of the cup, as if so projecting it will be liable to be struck by the hand moving over the cup and so cause the cup to spill or break. It is thus distinguished from infusors of the well known type in which handles or supports extend above the edges of the cup, which applicant's type of construction renders unnecessary and objectionable.

What I claim is:—

1. A comparatively thin elastically deformable infusor, having one of its dimensions in the ratio of approximately one to ten, or less, to its greatest dimension, so constructed as to give a rate of infusion closely approximating that of the unconfined infusive material.

2. An infusor of elastic material of such properties and construction as to be permanently deformed by use, through the expansion of the infusive material on immersion in the infusion liquid.

3. A comparatively thin elastically deformable infusor, having one of its dimensions in the ratio of approximately one to ten, or less, of its greatest dimension, and perforated on all sides perpendicularly to its said greatest dimension, so constructed as to give a rate of infusion closely approximating that of the unconfined infusive material.

4. A comparatively thin elastically deformable infusor, having one of its dimensions in the ratio of approximately one to ten, or less, of its greatest dimension, and having its edges sealed, so constructed that it will tend to float with said longest dimension in a vertical position, during the act of diffusion.

5. A completely sealed comparatively thin elastically deformable infusor, having one of its dimensions in the ratio of approximately on to ten, or less, of its greatest dimension, and having the figure of a thin disc or a coin.

REGINALD A. FESSENDEN.